Jan. 7, 1930.  W. F. RESLER  1,743,005
JACK
Filed April 2, 1928  3 Sheets-Sheet 1
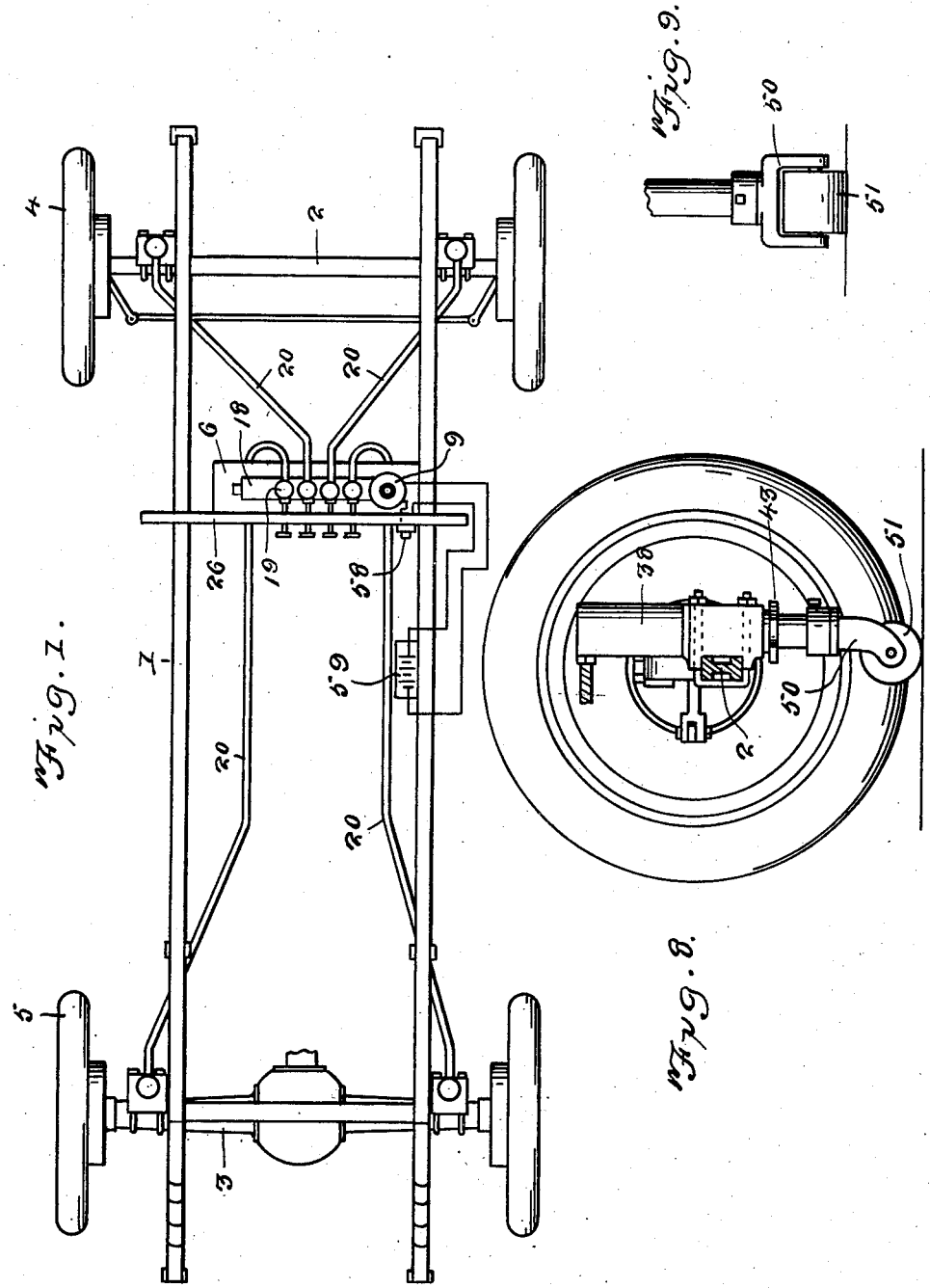
W. F. Resler
INVENTOR
BY Victor J. Evans
ATTORNEY Jan. 7, 1930.  W. F. RESLER  1,743,005
JACK
Filed April 2, 1928  3 Sheets-Sheet 2
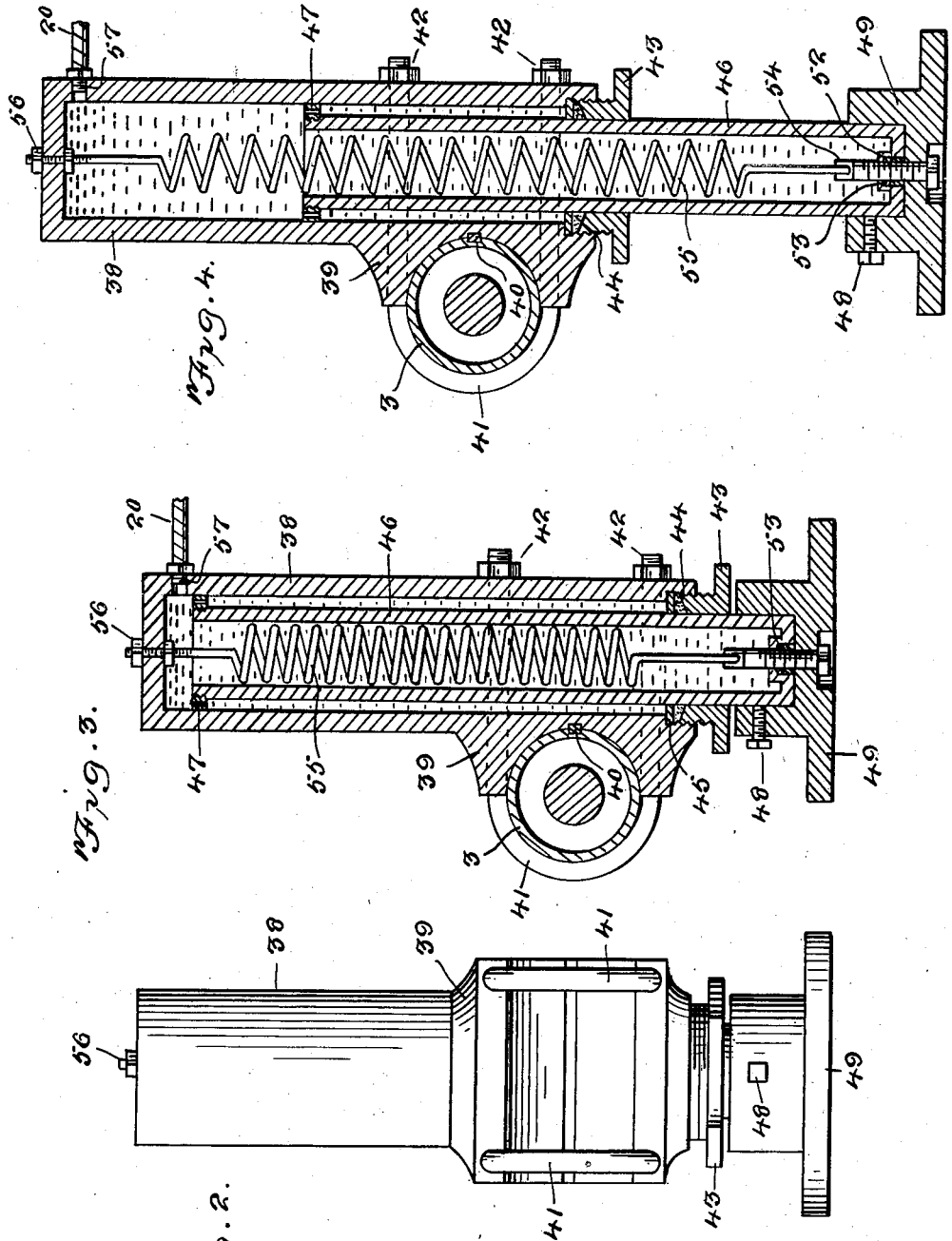
W. F. Resler
INVENTOR
BY Victor J. Evans
ATTORNEY

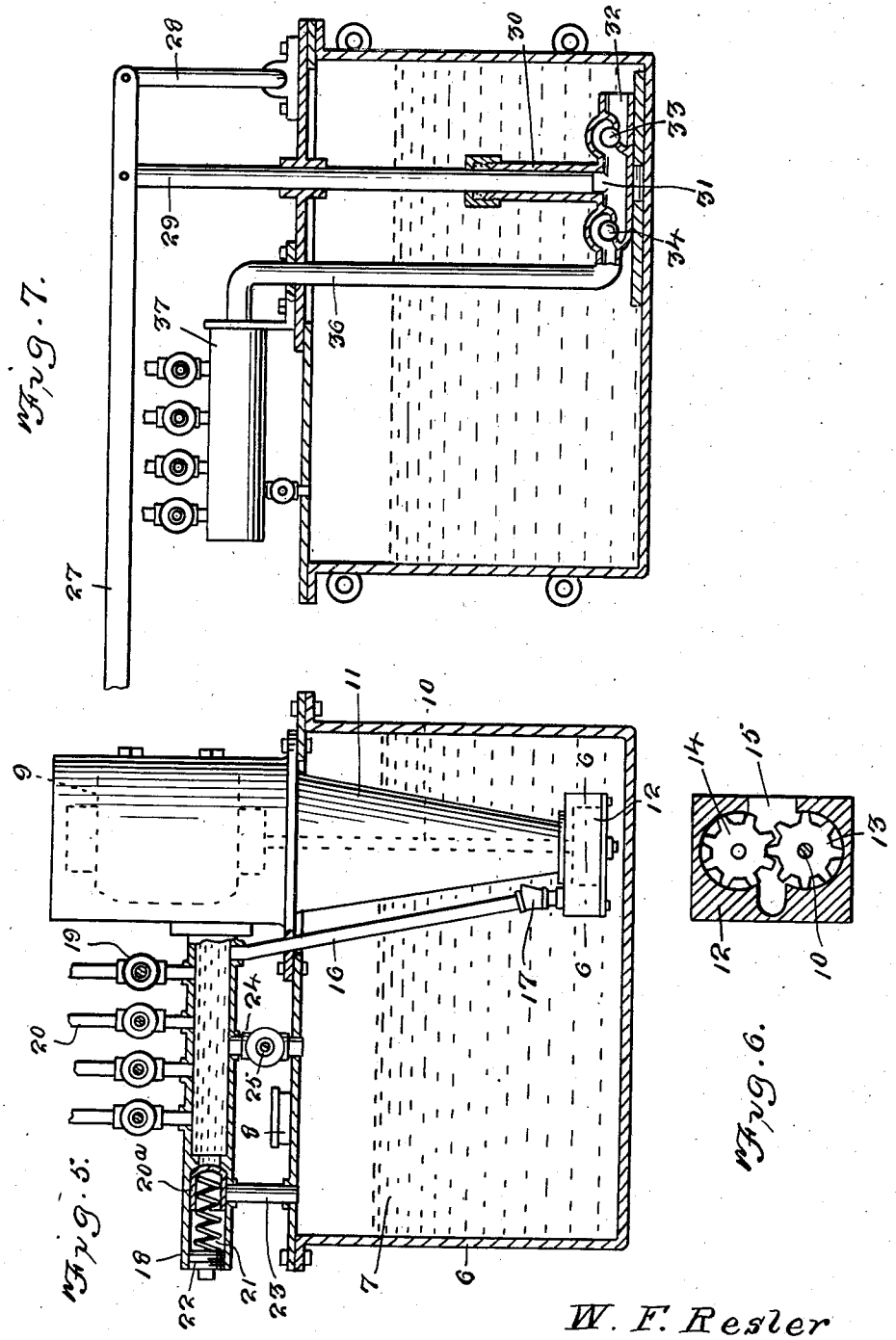

Patented Jan. 7, 1930

1,743,005

UNITED STATES PATENT OFFICE

WILLIAM FLOYD RESLER, OF CLAY CENTER, KANSAS

JACK

Application filed April 2, 1928. Serial No. 266,780.

My present invention has reference to a hydraulic jack for automobiles or like vehicles and my object is the provision of a device of this character whereby all or any one of the wheels of a vehicle may be elevated a desired distance above a ground surface for various purposes, as for instance to permit of the change of tires for the wheels, to permit of repairs being made under the body of the machine or to permit of the vehicle being wheeled into a small space either for parking or for storage.

A further object is the provision of a hydraulic jack for automobiles or like vehicles in which oil or like fluid is pumped from a suitable tank or container into a header or manifold that has valve controlled flexible or other tubes leading therefrom to jacks which are spring influenced in casings that are fixedly secured to the vehicle adjacent to the several wheels thereof, pump actuated means for forcing the oil or like fluid through any of the tubes to operate any or all of the jacks, means for preventing the return of the fluid to the pump, valve controlled means for allowing the fluid to return through the manifold back into the tank and to permit of the spring means influencing the jacks to their initial positions in the casings, together with a safety pressure valve in the manifold having a pipe connection with the tank, together with other novel details of construction.

A further object is the provision of a hydraulic jack which may be operated either by a power or a hand pump and wherein the construction is simple but positive and accurate in operation.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a top plan view of a chassis of an automobile or like vehicle equipped with the improvement.

Figure 2 is a side elevation of a jack.

Figure 3 is a substantially vertical longitudinal sectional view therethrough.

Figure 4 is a sectional view substantially similar to Figure 3 but showing the body or plunger of the jack influenced outward of the casing by fluid pressure.

Figure 5 is a substantially central vertical longitudinal sectional view through the oil or fluid storage tank and the elements associated therewith.

Figure 6 is a sectional view approximately on the line 6—6 of Figure 5.

Figure 7 is a view substantially similar to Figure 5 but illustrating the manner in which hand operated pumps may be employed.

Figure 8 is a detail elevation with parts in section to show the manner in which the base or foot of the jack may be equipped with a roller.

Figure 9 is a front elevation of the roller.

Referring now to the drawings in detail, and to Figure 1 in particular, the numeral 1 designates the chassis of an automobile or like vehicle, 2 the front axle therefor, and 3 the rear axle housing. The steering wheels are indicated by the numeral 4 and the propelling wheels by the numeral 5.

Supported between the side members of the frame of the vehicle, to the rear of the front axle 2 there is a tank 6 that provides a storage receptacle for a fluid body 7. The fluid is preferably in the nature of a comparatively heavy grade of oil and the tank 6 has at its top a normally closed filler spout 8 through which the oil is introduced into the tank.

In one of the embodiments of my improvement fixedly secured on the closed top of the tank 6 is an electrically operated motor which is broadly indicated by the numeral 9. As this motor is of the ordinary construction a detail description thereof will not be given. The shaft 10 of the motor extends through a suitable guide 11 into the tank 6, the said guide supporting at its lower end the housing 12 for a pump. In the showing of the drawings, the pump is of the rotary type, one of the toothed wheels 13 being turned by the shaft 10, the second toothed wheel 14 being in mesh with the toothed wheel 13. The pump introduces fluid into the housing 12 through an inlet opening 15 and directs the fluid therefrom through a pipe 16. The pipe 16 has arranged therein a check valve 17 which prevents the return of oil into the pump. The pipe 16 passes through the closed top of the tank 6 and enters the bottom of a tubular header or manifold 18.

The manifold 18 is suitably supported and is provided with four outlets, in each of which there is secured a pipe member controlled by a valve 19. To the valve casings there are connected flexible tubes 20 and these tubes are connected to the several jacks which will hereinafter be described. The outer end of the tubular header or manifold is open and has arranged in the bore thereof a seat for a safety pressure valve 20ª. The valve is influenced toward its seat through the medium of a spring 21 and this spring is contacted by an adjustable plug 22 which is screwed in the open end of the header or manifold. The valve 20ª normally closes a pipe 23 that is arranged between the header or manifold and the top of the tank 6. It will be apparent that an overpressure of oil in the header or manifold will unseat the valve 20ª to permit a determined quantity of such oil being returned through the pipe 23 into the tank 6.

Between the manifold and the tank 6 there is a valve controlled pipe 24. This pipe establishes return of the fluid from the jacks and manifold into the tank 6. It should here be stated that the valves 19 and the valve 25 in the pipe 24 have their stems passing through suitable openings in the dash or instrument board 26 of the automobile and likewise the said stems are provided with operating heads or handles.

In Figure 7 I have illustrated a tank and manifold construction similar to that just described, except in this instance the pump is hand operated. The operating lever for the pump is indicated by the numeral 27 and has one of its ends pivoted on a fulcrum element 28. The pump rod which is pivoted to the handle 27 is indicated by the numeral 29. This pump rod has on its end a suitable plunger that is received through a tubular portion or barrel 30 that is formed on the top of the pump body 31. The plunger rod passes through a suitable packing box in the top of the barrel. The pump body has adjacent to its inlet 32 a check valve 33 and is likewise provided with a second normally closed check valve 34 adjacent to the end thereof connected with the pipe 35 that leads to the header or manifold. The valves 33 and 34 may be in the nature of balls and prevent the return of fluid from the manifold through the pipe 36 and through the pump casing. The suction created by the reciprocation of the plunger through the operation of the handle 27 will, of course, suck fluid into the pump casing and force the same through the pipe 36 into the manifold 37. The manifold is of a construction similar to that previously described and is provided with the valve controlled pipes and the safety pressure valve or control.

As all of the jacks are of a similar construction a detail description of one will be taken as equally applicable to all. The several jacks are supported adjacent to the several wheels of the automobile. In the showing of Figure 1 I have illustrated the jacks for the front wheels 4 secured to the axle 2 for such wheels but obviously this is merely by way of illustration as the said jacks may be fixedly attached to the frame. The rear jacks, however, are preferably secured to the rear axle housing 3 as disclosed by the said Figure 1 and the manner of connecting these jacks to the supporting means therefor will be hereinafter explained. Each jack includes a cylinder 38 closed at its top but having an open bottom. Each cylinder is formed with an outwardly projected boss 39, and the boss from its outer face is depressed. When the cylinders are to be arranged upon the rear axle housing 3, these depressions are concaved and are channeled longitudinally for the reception of a spline 40 which also enters a groove or channel in the said housing. There are passed over the housing the rounded ends of a bolt member 41. The parallel arms of the bolt members pass through suitable openings in the casing at the opposite sides of the bolt member and these arms are engaged by nuts or like securing means 42. When the cylinders are arranged on the front axle 2 of the automobile or upon the frame the depressions in the bosses are of substantially rectangular formation and the double arm bolts have straight connecting portions as disclosed by Figure 8 of the drawings.

Screwed in the bottom of each of the cylinders 38 there is a packing nut 43 which contacts with the packing 44, forcing the same against a metal disc 45 which is seated on a shoulder in the bore of the cylinder. Passing through the packing nut, the disc 45 and engaged by the packing 44 there is the hollow tubular plunger 46 of the jack. Each plunger on the open end thereof which is received in the cylinder 38 has screwed or otherwise secured thereon an apertured guide ring or washer 47 which contacts with the bore of the cylinder. On the outer and closed end of each of the plungers 46 there may be secured, through the medium of a binding element 48 a flat shoe or base 49, or in lieu of this shoe or base there may be secured by similar binding means a collar on the end of a mount 50 for rollers 51 as disclosed by Figures 8 and 9 of the drawings. These rollers are preferably arranged on the front jacks but may, of course, be arranged on all of the jacks when the plungers are projected through the cylinders to elevate the vehicle to permit of the vehicle being wheeled into a small space for parking or temporary storage in a garage.

There is threaded through the closed bottom of each of the cylinders 38 an adjustable bolt 52, and the inner walls of the bottom of the cylinders are preferably provided with a packing box 53, so that oil cannot leak through the opening for the bolt. Each of the bolts 52 has preferably swivelly connected to the inner end thereof a head 54 and to this head there is secured one end of a coil or pressure spring 55, the second end of the said spring being secured by adjustable means 56 to the top of the cylinder 38.

Each of the cylinders, adjacent to the closed top thereof has an inlet port in which there is screwed a nipple 57 that is in turn connected to the armored and flexible pipes 20.

The construction and operation of the improvement will, it is thought, be understood and appreciated by those skilled in the art when the foregoing description has been carefully read in connection with the accompanying drawings. The valve 25 is closed when either of the pumps is in operation. The motor operated pump is controlled by a push button switch 58 arranged on the dash or instrument board 26 of the machine, the switch, of course, being wired to the motor and to a battery 59. The operation of the pump will force the oil into the manifold and as the valves 19 are opened such oil will be forced from the manifold through the several pipes 20 into the several cylinders. The oil acting on the plungers in the cylinders will move the same outwardly against the pressure or resistance of the springs 55. The check valves prevent the re-flow of oil from the manifolds into the tanks 6. When the plungers have been projected a desired distance to raise the car to a predetermined elevation the pump is no longer operated. The pressure of oil against the plungers will hold the same in extended positions for any desired length of time. When the vehicle is to be lowered the valve 25 is opened which permits of the springs 55 drawing the plungers into the cylinders and forcing the oil therefrom back to the manifold and from thence through the pipe to which the valve 25 is connected back into the tank 6.

Obviously by opening any one of the valves 19 any of the jacks may be projected through its cylinder and therefore, any wheel may be elevated above the ground surface.

Having described the invention, I claim:

A hydraulic vehicle jack comprising a tank adapted to contain a fluid, a cylinder located remotely with respect to the tank and having valve controlled communication therewith, said cylinder including an enlarged thickened portion formed with a recess to accommodate the axle housing of the vehicle, a clamp surounding said housing and cooperating with said thickened portion to support the cylinder thereon, a shoulder formed on the cylinder adjacent the lower end thereof, a packing nut threaded into the said end of the cylinder and bearing against said packing, a hollow cylindrical plunger slidably received by the cylinder and open at its upper end, said plunger sliding through said packing nut, a shoe including a hollow boss receiving the adjacent end of the plunger, means for securing the shoe to the plunger, a coil spring arranged within the plunger and having its upper end secured to the adjacent end of the cylinder, and adjustable means connecting the lower end of the spring with said shoe.

In testimony whereof I affix my signature.

WILLIAM FLOYD RESLER.